(12) United States Patent
Haler

(10) Patent No.: US 10,730,439 B2
(45) Date of Patent: Aug. 4, 2020

(54) VEHICLE-MOUNTED VIDEO SYSTEM WITH DISTRIBUTED PROCESSING

(71) Applicant: Digital Ally, Inc., Lenexa, KS (US)

(72) Inventor: Robert D. Haler, Blue Springs, MO (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 15/137,207

(22) Filed: Apr. 25, 2016

(65) Prior Publication Data
US 2016/0236621 A1 Aug. 18, 2016

Related U.S. Application Data

(63) Continuation of application No. 13/975,844, filed on Aug. 26, 2013, now Pat. No. 9,325,950, which is a (Continued)

(51) Int. Cl.
*B60R 1/12* (2006.01)
*B60R 11/04* (2006.01)
(Continued)

(52) U.S. Cl.
CPC ............. *B60R 1/12* (2013.01); *B60R 11/04* (2013.01); *G07C 5/0891* (2013.01); *H04N 5/225* (2013.01);
(Continued)

(58) Field of Classification Search
CPC ............ H04N 7/18; H04N 5/76; H04N 5/781; H04N 5/23293; H04N 5/765; H04N 5/907;
(Continued)

(56) References Cited

U.S. PATENT DOCUMENTS 4,789,904 A * 12/1988 Peterson ................. B60R 11/04
348/148
5,408,330 A * 4/1995 Squicciarini ......... G07C 5/0891
348/E7.09
(Continued)

FOREIGN PATENT DOCUMENTS

EP 2479993 A2 7/2012
GB 2485804 A 5/2012
(Continued)

OTHER PUBLICATIONS

Shapton, Dave "Digital Microphones: A new approach?" from soundonsound.com published Mar. 2004, 4 pages (Year: 2004).*
(Continued)

*Primary Examiner* — David R Lazaro
(74) *Attorney, Agent, or Firm* — Erise IP, P.A.

(57) ABSTRACT

A vehicle-mounted system for recording video and audio. The system uses distributed processing, including encoding the video and audio at their source(s), and a high-speed, e.g., Ethernet, bus connecting the various system components and external devices. The system may include a display monitor which is integrated into the same housing as a rear view mirror of the vehicle, with the display monitor being located behind the mirror and video displayed on the monitor being visible through the mirror.

20 Claims, 10 Drawing Sheets

Related U.S. Application Data continuation of application No. 12/189,192, filed on Aug. 10, 2008, now Pat. No. 8,520,069, and a continuation-in-part of application No. 11/531,955, filed on Sep. 14, 2006, now abandoned.

(60) Provisional application No. 60/955,129, filed on Aug. 10, 2007, provisional application No. 60/717,602, filed on Sep. 16, 2005.

(51) Int. Cl.

| | | |
|---|---|---|
| *G07C 5/08* | (2006.01) | |
| *H04N 5/225* | (2006.01) | |
| *H04N 5/232* | (2006.01) | |
| *H04N 5/76* | (2006.01) | |
| *H04N 5/765* | (2006.01) | |
| *H04N 5/77* | (2006.01) | |
| *H04N 5/775* | (2006.01) | |
| *H04N 5/781* | (2006.01) | |
| *H04N 5/907* | (2006.01) | |
| *H04N 9/82* | (2006.01) | |
| *H04N 7/18* | (2006.01) | |
| *B60R 11/00* | (2006.01) | |

(52) U.S. Cl.
CPC ....... *H04N 5/2251* (2013.01); *H04N 5/23293* (2013.01); *H04N 5/76* (2013.01); *H04N 5/765* (2013.01); *H04N 5/772* (2013.01); *H04N 5/775* (2013.01); *H04N 5/781* (2013.01); *H04N 5/907* (2013.01); *H04N 7/18* (2013.01); *H04N 9/8205* (2013.01); *B60R 2001/1253* (2013.01); *B60R 2011/0033* (2013.01)

(58) Field of Classification Search
CPC ...... H04N 7/181; H04N 5/225; H04N 5/2251; H04N 5/772; H04N 5/775; H04N 9/8205; H04N 1/32128; H04N 2101/00; H04N 2201/0084; H04N 2201/3233; H04N 2201/3235; H04N 2201/3236; H04N 2201/3252; H04N 2201/3253; H04N 2201/3274; H04N 2201/3277; H04N 5/85; H04N 5/9201; H04N 7/183; H04N 7/188; H04N 21/21805; H04N 21/2187; H04N 21/4126; H04N 21/41407; H04N 21/41422; H04N 21/4181; H04N 21/42203; H04N 21/4223; H04N 21/4263; H04N 21/42661; H04N 21/4312; H04N 21/4314; H04N 21/4334; H04N 21/47202; H04N 21/47815; H04N 21/6131; H04N 21/8126; H04N 5/232; H04N 5/23203; H04N 5/23225; H04N 5/23238; H04N 5/235; H04N 5/38; H04N 5/44; H04N 5/77; H04N 5/9261; H04N 7/17318; H04N 9/8042; B60R 11/04; B60R 2001/1253; B60R 1/12; B60R 2011/0033; B60R 1/00; B60R 2300/105; B60R 2300/106; B60R 2300/302; B60R 2300/804; B60R 2300/8053; B60R 11/0235; B60R 11/0241; B60R 11/0247; B60R 1/02; B60R 1/04; B60R 1/06; B60R 1/1207; B60R 2001/1215; B60R 2001/1223; B60R 2001/1284; B60R 2011/0026; B60R 2011/004; B60R 2011/0082; B60R 2011/0084; B60R 2011/0089; B60R 2011/0282; B60R 2011/0288; B60R 2011/0294; B60R 21/01566; B60R 2300/103; B60R 2300/406; B60R 2300/8026; B60R 2300/806; B60R 11/02; B60R 11/0211; B60R 2011/0052; B60R 2300/101; B60R 1/008; B60R 2300/207; B60R 2300/301; B60R 2300/304; B60R 2300/305; B60R 2300/8013; B60R 2300/802; B60R 2300/8066; G06F 16/50; G06F 21/78; H04L 67/12; H04L 69/329

See application file for complete search history.

(56) References Cited

U.S. PATENT DOCUMENTS

| | | | |
|---|---|---|---|
| 5,526,133 A | 6/1996 | Paff | |
| 5,752,632 A | 4/1998 | Sanderson et al. | |
| 5,850,613 A | 12/1998 | Bullecks | |
| 5,886,739 A | 3/1999 | Winningstad | |
| 5,962,806 A | 10/1999 | Coakley et al. | |
| 6,028,528 A * | 2/2000 | Lorenzetti | H04N 7/18 235/382.5 |
| 6,141,611 A * | 10/2000 | Mackey | G07C 5/008 340/438 |
| 6,324,053 B1 | 11/2001 | Kamijo | |
| RE37,709 E | 5/2002 | Dukek | |
| 6,396,403 B1 | 5/2002 | Haner | |
| 6,452,572 B1 | 9/2002 | Fan et al. | |
| 6,490,409 B1 | 12/2002 | Walker | |
| 6,560,463 B1 | 5/2003 | Santhoff | |
| 6,563,532 B1 | 5/2003 | Strub et al. | |
| 6,690,268 B2 * | 2/2004 | Schofield | B60C 23/00 340/425.5 |
| 6,748,792 B1 | 6/2004 | Freund et al. | |
| 6,757,828 B1 * | 6/2004 | Jaffe | H04N 1/32128 380/200 |
| 6,831,556 B1 | 12/2004 | Boykin | |
| 6,883,694 B2 | 4/2005 | Abelow | |
| 6,947,071 B2 * | 9/2005 | Eichmann | B60R 1/00 348/142 |
| 6,950,122 B1 | 9/2005 | Mirabile | |
| D520,738 S | 5/2006 | Tarantino | |
| 7,071,969 B1 | 7/2006 | Stimson, III | |
| 7,088,387 B1 | 8/2006 | Freeman et al. | |
| D529,528 S | 10/2006 | Ross et al. | |
| 7,190,882 B2 * | 3/2007 | Gammenthaler | G08B 13/19647 348/143 |
| 7,363,742 B2 | 4/2008 | Nerheim | |
| 7,421,024 B2 | 9/2008 | Castillo | |
| 7,436,143 B2 | 10/2008 | Lakshmanan et al. | |
| 7,456,875 B2 | 11/2008 | Kashiwa | |
| 7,508,941 B1 | 3/2009 | O'Toole, Jr. et al. | |
| 7,511,737 B2 | 3/2009 | Singh | |
| 7,583,184 B2 * | 9/2009 | Schofield | B60C 23/00 340/425.5 |
| 7,594,305 B2 | 9/2009 | Moore | |
| 7,656,439 B1 | 2/2010 | Manico et al. | |
| 7,697,035 B1 | 4/2010 | Suber, III et al. | |
| 7,796,162 B2 * | 9/2010 | Ortiz | H04N 5/232 348/157 |
| 7,806,525 B2 | 10/2010 | Howell et al. | |
| 7,853,944 B2 | 12/2010 | Choe | |
| 7,944,676 B2 | 5/2011 | Smith et al. | |
| 8,077,029 B1 | 12/2011 | Daniel et al. | |
| 8,121,306 B2 | 2/2012 | Cilia et al. | |
| 8,175,314 B1 | 5/2012 | Webster | |
| 8,269,617 B2 | 9/2012 | Cook et al. | |
| 8,314,708 B2 | 11/2012 | Gunderson et al. | |
| 8,350,907 B1 | 1/2013 | Blanco et al. | |
| 8,356,438 B2 | 1/2013 | Brundula et al. | |
| 8,373,567 B2 | 2/2013 | Denson | |
| 8,373,797 B2 | 2/2013 | Ishii et al. | |
| 8,384,539 B2 | 2/2013 | Denny et al. | |
| 8,446,469 B2 | 5/2013 | Blanco et al. | |
| 8,456,293 B1 | 6/2013 | Trundle et al. | |
| 8,503,972 B2 | 8/2013 | Haler et al. | |

(56) References Cited

U.S. PATENT DOCUMENTS

| | | |
|---|---|---|
| 8,508,353 B2 | 8/2013 | Cook et al. |
| 8,520,069 B2* | 8/2013 | Haler .................... B60R 1/12 340/293 |
| 8,594,485 B2 | 11/2013 | Brundula |
| 8,606,492 B1 | 12/2013 | Botnen |
| 8,676,428 B2 | 3/2014 | Richardson et al. |
| 8,690,365 B1 | 4/2014 | Williams |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,887,208 B1 | 11/2014 | Merrit et al. |
| 8,890,954 B2 | 11/2014 | O'Donnell et al. |
| 8,896,694 B2 | 11/2014 | O'Donnell et al. |
| 8,930,072 B1 | 1/2015 | Lambert et al. |
| 8,934,045 B2 | 1/2015 | Karn et al. |
| 8,989,914 B1 | 3/2015 | Nemat-Nasser et al. |
| 8,996,234 B1 | 3/2015 | Tamari et al. |
| 8,996,240 B2 | 3/2015 | Plante |
| 9,002,313 B2 | 4/2015 | Sink et al. |
| 9,003,474 B1 | 4/2015 | Smith |
| 9,058,499 B1 | 6/2015 | Smith |
| 9,122,082 B2 | 9/2015 | Abreau |
| 9,123,241 B2 | 9/2015 | Grigsby et al. |
| 9,164,543 B2 | 10/2015 | Minn et al. |
| 9,253,452 B2 | 2/2016 | Ross et al. |
| 9,325,950 B2* | 4/2016 | Haler .................... B60R 1/12 |
| 9,591,255 B2 | 3/2017 | Sakiewica et al. |
| 9,728,228 B2 | 8/2017 | Palmer et al. |
| 2001/0033661 A1 | 10/2001 | Prokoski |
| 2002/0019696 A1* | 2/2002 | Kruse .................... G01C 21/26 701/408 |
| 2002/0084130 A1 | 7/2002 | Der Gazarian et al. |
| 2002/0159434 A1 | 10/2002 | Gosior et al. |
| 2002/0191952 A1 | 12/2002 | Fiore et al. |
| 2003/0080713 A1 | 5/2003 | Kirmuss |
| 2003/0080878 A1* | 5/2003 | Kirmuss ................ B60R 11/02 340/936 |
| 2003/0081121 A1* | 5/2003 | Kirmuss ................ B60R 11/02 348/143 |
| 2003/0081934 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |
| 2003/0106917 A1 | 6/2003 | Shelter et al. |
| 2003/0133018 A1 | 7/2003 | Ziemkowski |
| 2003/0151510 A1 | 8/2003 | Quintana et al. |
| 2003/0184674 A1 | 10/2003 | Manico et al. |
| 2003/0185417 A1* | 10/2003 | Alattar .................... G06T 1/0064 382/100 |
| 2003/0215010 A1 | 11/2003 | Kashiwa |
| 2003/0215114 A1 | 11/2003 | Kyle |
| 2004/0143373 A1 | 6/2004 | Ennis |
| 2004/0168002 A1 | 8/2004 | Accarie et al. |
| 2004/0199785 A1* | 10/2004 | Pederson ........... G07C 9/00158 340/293 |
| 2004/0223054 A1 | 11/2004 | Rotholtz |
| 2004/0243734 A1* | 12/2004 | Kitagawa ................ G06F 21/78 710/13 |
| 2005/0050266 A1 | 3/2005 | Haas et al. |
| 2005/0068169 A1 | 3/2005 | Copley et al. |
| 2005/0068417 A1* | 3/2005 | Kreiner ................ G07C 5/0858 348/143 |
| 2005/0083404 A1 | 4/2005 | Pierce et al. |
| 2005/0094966 A1 | 5/2005 | Elberbaum |
| 2005/0100329 A1* | 5/2005 | Lao ................ G08B 13/19647 386/216 |
| 2005/0101334 A1 | 5/2005 | Brown et al. |
| 2005/0132200 A1* | 6/2005 | Jaffe .................. H04N 1/32128 713/176 |
| 2005/0151852 A1 | 7/2005 | Jomppanen |
| 2005/0035161 A1 | 8/2005 | Shioda |
| 2005/0206532 A1 | 9/2005 | Lock |
| 2005/0206741 A1 | 9/2005 | Raber |
| 2005/0243171 A1 | 11/2005 | Ross, Sr. et al. |
| 2005/0258942 A1 | 11/2005 | Manasseh et al. |
| 2006/0055786 A1 | 3/2006 | Ohba |
| 2006/0082730 A1 | 4/2006 | Franks |
| 2006/0125919 A1* | 6/2006 | Camilleri ................ B60R 1/00 348/148 |
| 2006/0158968 A1 | 7/2006 | Vanman et al. |
| 2006/0164534 A1 | 7/2006 | Robinson et al. |
| 2006/0183505 A1 | 8/2006 | Willrich |
| 2006/0193749 A1 | 8/2006 | Ghazarian et al. |
| 2006/0203090 A1 | 9/2006 | Wang et al. |
| 2006/0220826 A1 | 10/2006 | Rast |
| 2006/0225253 A1 | 10/2006 | Bates |
| 2006/0244601 A1 | 11/2006 | Nishimura |
| 2006/0267773 A1 | 11/2006 | Roque |
| 2006/0271287 A1 | 11/2006 | Gold et al. |
| 2006/0274166 A1 | 12/2006 | Lee et al. |
| 2006/0276200 A1 | 12/2006 | Radhakrishnan et al. |
| 2007/0091557 A1 | 4/2007 | Kim et al. |
| 2007/0117083 A1 | 5/2007 | Winneg et al. |
| 2007/0132567 A1* | 6/2007 | Schofield ................ B60C 23/00 340/438 |
| 2007/0172053 A1 | 7/2007 | Poirier |
| 2007/0177023 A1 | 8/2007 | Beuhler et al. |
| 2007/0195939 A1 | 8/2007 | Sink et al. |
| 2007/0199076 A1 | 8/2007 | Rensin et al. |
| 2007/0213088 A1 | 9/2007 | Sink |
| 2007/0247470 A1 | 11/2007 | Kahiwa et al. |
| 2007/0274705 A1 | 11/2007 | Kashiwa |
| 2007/0277352 A1 | 12/2007 | Maron et al. |
| 2007/0287425 A1 | 12/2007 | Bates |
| 2007/0297320 A1 | 12/2007 | Brummette et al. |
| 2008/0002031 A1 | 1/2008 | Cana et al. |
| 2008/0002599 A1 | 2/2008 | Denny et al. |
| 2008/0030580 A1 | 2/2008 | Kashhiwa et al. |
| 2008/0042825 A1 | 2/2008 | Denny et al. |
| 2008/0063252 A1 | 3/2008 | Dobbs et al. |
| 2008/0084473 A1 | 4/2008 | Romanowich |
| 2008/0100705 A1 | 5/2008 | Kister et al. |
| 2008/0122603 A1 | 5/2008 | Piante et al. |
| 2008/0143481 A1 | 6/2008 | Abraham et al. |
| 2008/0144705 A1 | 6/2008 | Rackin et al. |
| 2008/0169929 A1 | 7/2008 | Albertson et al. |
| 2008/0170130 A1 | 7/2008 | Ollila et al. |
| 2008/0175565 A1 | 7/2008 | Takakura et al. |
| 2008/0222849 A1 | 9/2008 | Lavoie |
| 2008/0239064 A1 | 10/2008 | Iwasaki |
| 2008/0307435 A1 | 12/2008 | Rehman |
| 2008/0316331 A1 | 12/2008 | Bedell et al. |
| 2009/0002491 A1* | 1/2009 | Haler .................... B60R 1/12 348/148 |
| 2009/0002556 A1 | 1/2009 | Manapragada et al. |
| 2009/0027499 A1 | 1/2009 | Nicholl |
| 2009/0052685 A1 | 2/2009 | Cilia et al. |
| 2009/0085740 A1 | 4/2009 | Klein et al. |
| 2009/0109292 A1 | 4/2009 | Ennis |
| 2009/0135007 A1 | 5/2009 | Donovan et al. |
| 2009/0141129 A1 | 6/2009 | Dischinger |
| 2009/0169068 A1 | 7/2009 | Okamoto |
| 2009/0189981 A1 | 7/2009 | Siann et al. |
| 2009/0195686 A1 | 8/2009 | Shintani |
| 2009/0207252 A1 | 8/2009 | Raghunath |
| 2009/0213204 A1 | 8/2009 | Wong |
| 2009/0225189 A1 | 9/2009 | Morin |
| 2009/0251545 A1 | 10/2009 | Shekarri et al. |
| 2009/0276708 A1 | 11/2009 | Smith et al. |
| 2009/0294538 A1 | 12/2009 | Wihlborg et al. |
| 2009/0324203 A1 | 12/2009 | Wiklof |
| 2010/0045798 A1 | 2/2010 | Sugimoto et al. |
| 2010/0060747 A1 | 3/2010 | Woodman |
| 2010/0097221 A1 | 4/2010 | Kreiner et al. |
| 2010/0106707 A1 | 4/2010 | Brown et al. |
| 2010/0118147 A1 | 5/2010 | Dorneich et al. |
| 2010/0122435 A1 | 5/2010 | Markham |
| 2010/0123779 A1 | 5/2010 | Snyder et al. |

(56) References Cited

U.S. PATENT DOCUMENTS

| | | |
|---|---|---|
| 2010/0177193 A1 | 7/2010 | Flores |
| 2010/0177891 A1 | 7/2010 | Keidar et al. |
| 2010/0194885 A1 | 8/2010 | Plaster |
| 2010/0217836 A1 | 8/2010 | Rofougaran |
| 2010/0238262 A1 | 9/2010 | Kurtz et al. |
| 2010/0242076 A1 | 9/2010 | Potesta et al. |
| 2010/0265331 A1 | 10/2010 | Tanaka |
| 2010/0274816 A1 | 10/2010 | Guzik |
| 2011/0006151 A1 | 1/2011 | Beard |
| 2011/0018998 A1 | 1/2011 | Guzik |
| 2011/0050904 A1 | 3/2011 | Anderson |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0098924 A1 | 4/2011 | Baladeta et al. |
| 2011/0129151 A1 | 6/2011 | Saito et al. |
| 2011/0157759 A1 | 6/2011 | Smith et al. |
| 2011/0187895 A1 | 8/2011 | Cheng et al. |
| 2011/0261176 A1 | 10/2011 | Monaghan, Sr. et al. |
| 2011/0281547 A1 | 11/2011 | Cordero |
| 2011/0301971 A1 | 12/2011 | Roesch et al. |
| 2011/0314401 A1 | 12/2011 | Salisbury et al. |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0120258 A1 | 5/2012 | Boutell et al. |
| 2012/0162436 A1 | 6/2012 | Cordell et al. |
| 2012/0188345 A1 | 7/2012 | Salow |
| 2012/0189286 A1 | 7/2012 | Takayama et al. |
| 2012/0195574 A1 | 8/2012 | Wallace |
| 2012/0230540 A1 | 9/2012 | Calman et al. |
| 2012/0257320 A1 | 10/2012 | Brundula et al. |
| 2012/0268259 A1 | 10/2012 | Igel et al. |
| 2012/0276954 A1 | 11/2012 | Kowalsky |
| 2013/0021153 A1 | 1/2013 | Keays |
| 2013/0033610 A1 | 2/2013 | Osborn |
| 2013/0035602 A1 | 2/2013 | Gemer |
| 2013/0080836 A1 | 3/2013 | Stergiou et al. |
| 2013/0096731 A1 | 4/2013 | Tamari et al. |
| 2013/0125000 A1 | 5/2013 | Flischhauser et al. |
| 2013/0148295 A1 | 6/2013 | Minn et al. |
| 2013/0222640 A1 | 8/2013 | Baek et al. |
| 2013/0225309 A1 | 8/2013 | Bentley et al. |
| 2013/0285232 A1 | 10/2013 | Sheth |
| 2013/0290018 A1 | 10/2013 | Anderson et al. |
| 2013/0300563 A1 | 11/2013 | Glaze |
| 2013/0343571 A1 | 12/2013 | Lee |
| 2014/0037262 A1 | 2/2014 | Sako |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0098453 A1 | 4/2014 | Brundula et al. |
| 2014/0140575 A1 | 5/2014 | Wolf |
| 2014/0170602 A1 | 6/2014 | Reed |
| 2014/0192194 A1 | 7/2014 | Bedell et al. |
| 2014/0195105 A1 | 7/2014 | Lambert et al. |
| 2014/0195272 A1 | 7/2014 | Sadiq et al. |
| 2014/0210625 A1 | 7/2014 | Nemat-Nasser |
| 2014/0218544 A1 | 8/2014 | Senot et al. |
| 2014/0227671 A1 | 8/2014 | Olmstead et al. |
| 2014/0311215 A1 | 10/2014 | Keays et al. |
| 2014/0341532 A1 | 11/2014 | Marathe et al. |
| 2014/0355951 A1 | 12/2014 | Tabak |
| 2015/0050003 A1 | 2/2015 | Ross et al. |
| 2015/0050345 A1 | 2/2015 | Smyth et al. |
| 2015/0051502 A1 | 2/2015 | Ross |
| 2015/0053776 A1 | 3/2015 | Rose et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0229630 A1 | 8/2015 | Smith |
| 2015/0317368 A1 | 11/2015 | Rhoads et al. |
| 2015/0332424 A1 | 11/2015 | Kane et al. |
| 2015/0358549 A1 | 12/2015 | Cho et al. |
| 2016/0042767 A1 | 2/2016 | Araya et al. |
| 2016/0104508 A1 | 4/2016 | Chee et al. |
| 2016/0127695 A1 | 5/2016 | Zhang et al. |
| 2016/0165192 A1 | 6/2016 | Saatchi et al. |
| 2016/0364621 A1 | 12/2016 | Hill et al. |
| 2017/0070659 A1 | 3/2017 | Kievsky et al. |
| 2017/0195635 A1 | 7/2017 | Yokomitsu et al. |
| 2017/0200476 A1 | 7/2017 | Chen et al. |
| 2017/0230605 A1 | 8/2017 | Han et al. |
| 2017/0237950 A1 | 8/2017 | Araya et al. |
| 2017/0244884 A1 | 8/2017 | Burtey et al. |
| 2017/0277700 A1 | 9/2017 | Davis et al. |
| 2017/0287523 A1 | 10/2017 | Hodulik et al. |
| 2018/0023910 A1 | 1/2018 | Kramer |
| 2018/0050800 A1 | 2/2018 | Boykin et al. |

FOREIGN PATENT DOCUMENTS

| | | |
|---|---|---|
| IE | 20090923 A1 | 9/2010 |
| JP | 2000137263 A | 5/2000 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 2004036926 A2 | 4/2004 |
| WO | 2011001180 A1 | 1/2011 |
| WO | 2012037139 A2 | 3/2012 |
| WO | 2012120083 A1 | 9/2012 |
| WO | 2014000161 A1 | 1/2014 |
| WO | 2014052898 A1 | 4/2014 |

OTHER PUBLICATIONS

International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2013.
Petition for Inter Partes Review No. 2017-00376, *Taser International, Inc.* v. *Digital Ally, Inc.*, filed Dec. 1, 2013.
Petition for Inter Partes Review No. 2017-00515, *Taser International, Inc.* v. *Digital Ally Inc.*, filed Jan. 11, 2017.
PCT Patent Application PCT/US16/34345 International Search Report and Written Opinion dated Dec. 29, 2016.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint for Patent Infringement, May 27, 2016.
State of Utah Invitation to Bid State Cooperative Contract; Vendor: Kustom Signals Inc., Contract No. MA1991, Apr. 25, 2008.
Petition for Inter Partes Review No. 2017-00775, *Taser International, Inc.* v. *Digital Ally Inc.*, filed Jan. 25, 2017.
Invalidity Chart for International Publication No. WO2014/000161 Oct. 31, 2017 (Resubmitted).
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.
PCT Patent Application PCT/US17/16383 International Search Report and Written Opinion dated May 4, 2017.
Invalidity Chart for International Publication No. WO2014/000161 Oct. 31, 2017.
European Patent Application 15850436.6 Search Report dated May 4, 2018.
Final Written Decision for Inter Partes Review No. 2017-00375, Axon Enterprise Inc. v. Digital Ally, Inc., issued Jun. 1, 2018.
Decision Denying Institution of Post Grant Review for Post Grant Review No. PGR2018-00052, *Axon Enterprise, Inc.* v. *Digital Ally, Inc.* issued Oct. 1, 2018.
Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.

(56) References Cited

OTHER PUBLICATIONS

Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date Page Last Modified: Sep. 14, 2014; <http://en.wikipedia.org/wiki/Breathalyzer>.
Brick House Secunty Body Worn Cameras / Hidden Cameras / Covert Spy Cameras, http://www.brickhousesecunty.com/body-worn-covert-spy-cameras.html?sf=0#sortblock&CMPID=PD_Google_%22body+camera%22&utm_source=google&utm_medium=cpc&utm_term=%22body+camera%22&mm_campaign=876a94ea5dd198a8c5dc3d1e67eccb34&keyword=%22body+camera%22&utm_source=google&utm_medium=cpc&utm_campaign=Cameras++Body+Worn+Cameras&c1=323-29840300-1, BrickHouse Security Body Worn Cameras—Printed from www.brickhousesecurity.com—2 pages—Date: Sep. 26, 2013.
Brown, TP-Link TL-WDR3500 Wireless N600 Router Review, Mar. 6, 2013.
Controller Area Network (CAN) Overview, National Instruments White Paper, Aug. 1, 2014.
Digital Ally First Vu Mountable Digital Camera Video Recorder, http://www.opticsplanet.com/digital-ally-first-vu-mountable-digital-camera-video-recorder.html?gclid=CIKohcX05rkCFSIo7AodU0IA0g&ef_id=UjCGEAAAAWGEjrQF:20130925155534:s, Sep. 25, 2013, Date Posted: Unknown, pp. 1-4.
*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.
Drift X170, http://driftinnovation.com/support/firmware-update/x170/, Sep. 26, 2013, Date Posted: Unknown, p. 1.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
Ecplaza HY-001HD law enforcement DVR, http://ffireeye.en.ecplaza.net/law-enforcement-dvr--238185-1619696.html, Sep. 26, 2013, Date Posted: Unknown, pp. 1-3.
Edesix VideoBadge, http://www.edesix.com/edesix-products, Sep. 26, 2013, Date Posted: Unknown, pp. 1-3.
Freudenrich, Craig, Ph.D.; "How Breathalyzers Work—Why Test?." HowStuff Works. Printed Date: Oct. 16, 2014; Posted Date: Unknown; <http://electronics.howstuffworks.com/gadgets/automotive/breathalyzer1.htm>.
GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
Guide to Bluetooth Security: Recommendations of the National Institute of Standards and Technology, National Institute of Standards and Technology, U.S. Dep't of Commerce, NIST Special Publication 800-121, Revision 1 (Jun. 2012).
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20/20 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20/20 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Isaw Advance Hull HD EXtreme, www.isawcam.co.kr, Sep. 26, 2013, Date Posted: Unknown, p. 1.
Kopin Corporation; Home Page; Printed Date: Oct. 16, 2014; Posted Date: Unknown; <http://www.kopin.com>.
Translation of Korean Patent No. 10-1050897, published Jul. 20, 2011.
Kustom Signals VieVu, http://www.kustomsignals.com/index.php/mvideo/vievu, Sep. 26, 2013, Date Posted: Unknown, pp. 1-4.
LEA-AID Scorpion Micro Recorder Patrol kit,http://www.leacorp.com/products/SCORPION-Micro-Recorder-Patrol-kit.html, Sep. 26, 2013, Date Posted: Unknown, pp. 1-2.
Looxcie Wearable & mountable streaming video cams, http://www.looxcie.com/overview?gclid=CPbDyv6piq8CFWeFQAodlhXC-w, Sep. 26, 2013, Date Posted: Unknown, pp. 1-4.
Midland XTC HD Video Camera, http://midlandradio.com/Company/xtc100-signup, Sep. 26, 2013, Date Posted: Unknown, pp. 1-3.
Near Field Communication; Sony Corporation; pp. 1-7, Date: Unknown.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
Panasonic Handheld AVCCAM HD Recorder/Player, http://www.panasonic.com/business/provideo/ag-hmr10.asp, Sep. 26, 2013, Date Posted: Unknown, pp. 1-2.
Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.
Notification of Transmittal of the International Search Report and the Written Opinion of the International Searching Authority, or the Declaration dated Feb. 4, 2016; International Application No. PCT/US2015/056052; International Filing Date: Oct. 16, 2015; Applicant: Digital Ally, Inc.
Point of View Cameras Military & Police, http://pointofviewcameras.com/military-police, Sep. 26, 2013, Date Posted: Unknown, pp. 1-2.
City of Pomona Request for Proposals for Mobile Video Recording System for Police Vehicles, dated prior to Apr. 4, 2013.
POV.HD System Digital Video Camera, http://www.vio-pov.com/index.php, Sep. 26, 2013, Date Posted: Unknown, pp. 1-3.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.
Request for Comment 1323 of the Internet Engineering Task Force, TCP Extensions for High Performance, Date: May 1992.
RevealMedia RS3-SX high definition video recorder, http://www.revealmedia.com/buy-t166/cameras/rs3-sx.aspx, Sep. 26, 2013, Date Posted: Unknown, pp. 1-2.
Scorpion Micro DV Video Audio Recorder, http://www.leacorp.com/scorpion-micro-dv-video-audio-recorder/, Sep. 26, 2013, Date Posted: Unknown, pp. 1-3.
SIV Security in Vehicle Driving Partner, http://www.siv.co.kr/, Sep. 26, 2013, Date Posted: Unknown, p. 1.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
Stalker VUE Law Enforcement Grade Body Worn Video Camera/Recorder, http://www.stalkerradar.com/law_vue.shtml, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
Taser Axon Body on Officer Video/Police Body Camera, http://www.taser.com/products/on-officer-video/axon-body-on-officer-video, Sep. 23, 2013, Date Posted: Unknown, pp. 1-8.

(56) References Cited

OTHER PUBLICATIONS

Taser Axon Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
UCorder Pockito Wearable Mini Pocket Camcorder, http://www.ucorder.com/, Sep. 26, 2013, Date Posted: Unknown, p. 1.
U.S. Appl. No. 15/011,132 Office Action dated Apr. 18, 2016, 19 pages.
State of Utah Invitation to Bid State Cooperative Contract; Vendor: ICOP Digital, Inc., Contract No. MA503, Jul. 1, 2008.
Veho Muvi HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnet.co.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
Vievu Products, http://www.vievu.com/vievu-products/vievu-squared/, Sep. 25, 2013, Date Posted: Unknown, pp. 1-2.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
WolfCom 3rd Eye, X1 A/V Recorder for Police and Military, http://wolfcomusa.com/Products/Products.html, Sep. 26, 2013, Date Posted: Unknown, pp. 1-3.
X26 Taser, Date Unknown.
Taser International; Taser X26 Specification Sheet, 2003.
Zepcam Wearable Video Technology, http://www.zepcam.com/product.aspx, Sep. 26, 2013, Date Posted: Unknown, pp. 1-2.
Dees, Tim; Taser Axon Flex: The next generation of body camera; <http://www.policeone.com/police-products/body-cameras/articles/527231-0-TASER-Axon-Flex-The-next-generation-of-body-cameral>, Date Posted: Mar. 12, 2012; Date Printed: Oct. 27, 2015.
Motor Magazine Article, Recreating the Scene of an Accident, published 2005.

\* cited by examiner

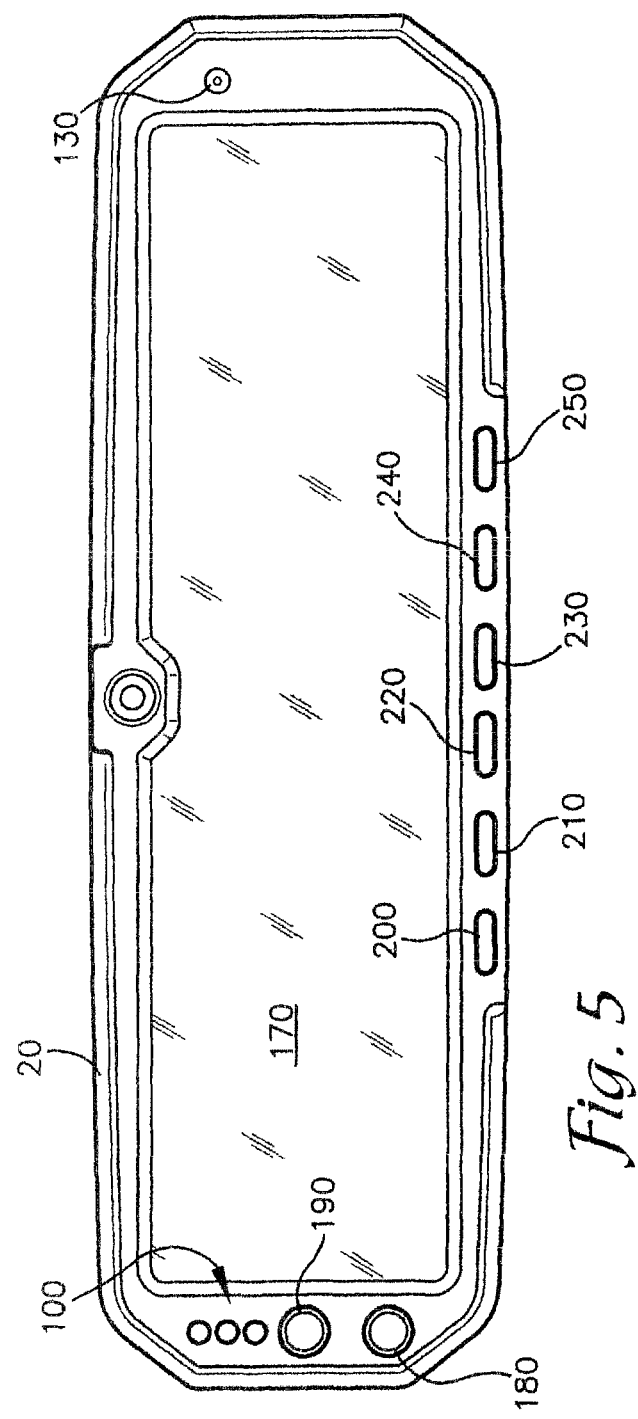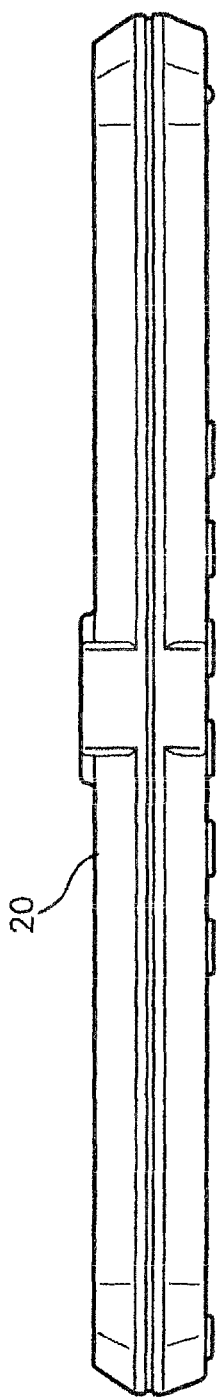

VEHICLE-MOUNTED VIDEO SYSTEM WITH DISTRIBUTED PROCESSING

RELATED APPLICATIONS

The present application is a continuation, and claims priority benefit with regard to all common subject matter, of earlier-filed U.S. patent application Ser. No. 13/975,844, filed Aug. 26, 2013, now U.S. Pat. No. 9,325,950, issued Apr. 26, 2016, and entitled "Vehicle-Mounted Video System with Distributed Processing" ("the '950 Patent"). The '950 Patent is a continuation, and claims priority benefit with regard to all common subject matter, of earlier-filed U.S. patent application Ser. No. 12/189,192, filed Aug. 10, 2008, now U.S. Pat. No. 8,520,069, issued Aug. 27, 2013, and entitled "Vehicle-Mounted Video System with Distributed Processing" ("the '069 Patent"). The '069 Patent is a continuation-in-part, and claims priority benefit with regard to all common subject matter, of U.S. patent application Ser. No. 11/531,955, filed Sep. 14, 2006, now abandoned, and entitled "Vehicle-Mounted Video System with Distributed Processing" ("the '955 application"). The '955 application is a non-provisional, and claims priority benefit with regard to all common subject matter, of U.S. Provisional Application No. 60/717,602, filed Sep. 16, 2005, and entitled "Rear View Mirror with Integrated Video System."

The '069 Patent is also a non-provisional, and claims priority benefit with regard to all common subject matter, of U.S. Provisional Application No. 60/955,129, filed Aug. 10, 2007, and entitled "Vehicle-Mounted Video System with Distributed Processing." Each of the identified earlier-filed patent and patent applications are hereby incorporated by reference into the present patent application in their entirety.

FIELD

The present invention relates generally to vehicle-mounted systems for recording video and audio. More particularly, the present invention concerns such a system using distributed processing, including encoding the video and audio at their source(s), and a high-speed, e.g., Ethernet, bus connecting the various system components and external devices.

BACKGROUND

Many law enforcement vehicles include video systems for recording and displaying activity in and around the vehicle. Unfortunately, these systems typically consist of one or two cameras and an independent display monitor that is difficult to view while the vehicle is in operation. Moreover, the current systems are expensive, bulky, and difficult to operate and maintain. It is also difficult to find sufficient space for the camera, recording system, and monitor in the law enforcement vehicles, which are already heavily loaded with extra equipment. It is possible to locate certain components, such as the recording system, which do not need to be frequently accessed, in the trunk of the vehicle, but this then requires long cables extending through the vehicle to connect the recording system with the camera and monitor. Additionally, many current systems are limited to simply recording and displaying visual images of the activity, and do not provide any additional information associated with the activity.

Furthermore, current systems are designed with a single central processor unit (CPU) which controls most or all major functions, including encoding video received from a camera. Unfortunately, centralized processing creates bottlenecks for both speed and processing capabilities (depending on the CPU, encoding video signals may require 75% the CPU's processing capability), requires significant changes in order to add new hardware features, and, generally, results in an inability to make changes to the system without investing significant expense and time. Additionally, communicating unencoded analog signals within the vehicle to the single CPU can result in significant electrical interference and signal degradation.

SUMMARY

The present invention overcomes the above-identified and other problems by providing a vehicle-mounted video and audio recording system using distributed processing, including encoding the video and audio at their source(s), and a high-speed, e.g., Ethernet, bus connecting the various system components and external devices.

In one embodiment, the video system for a vehicle broadly comprises a video camera mounted on the vehicle and operable to both capture and encode video, a central control unit mounted on the vehicle and operable to receive and decode the encoded video, and a display monitor mounted on the vehicle and operable to display the decoded video.

In various implementations, the video system may further include any one or more of the following features. The video camera may be synchronized with the central control unit so as to provide an accurate time stamp associated with the video. The video camera may be operable to implement a pre-event recording loop. The video camera and central control unit may be connected by a high speed bus. There may be two or more video cameras connected to a hub, wherein the hub is connected to the central control unit, and the central control unit is operable to receive the encoded video from each of the two or more video cameras substantially simultaneously. The system may include a microphone operable to capture and encode audio, wherein the central control unit is operable to receive and decode the encoded audio, a vehicle interface box mounted on the vehicle and operable to interface an external device to the central control unit, wherein the external device may be any one or more of a crash sensor, a radar gun, and a speedometer, and a co-processing module mounted on the vehicle and operable to provide processing for an additional feature of the system, wherein the additional feature may be any one or more of a face recognition feature, a license plate recognition feature, a streaming video feature, and a wireless Internet access feature.

The system may include a rear view mirror housing, a mirror mounted in the rear view mirror housing, and the display monitor mounted in the rear view mirror housing substantially behind the mirror, and the mirror and the display monitor being configured so that the displayed video is viewable through the mirror.

The system may include a location determining device operable to determine a location of the vehicle when the video is captured, and a recording medium operable to record at a least a portion of the captured video and the location of the vehicle when the video was captured.

These and other details of the present invention are described in greater below in the section below titled DETAILED DESCRIPTION.

BRIEF DESCRIPTION OF THE DRAWINGS

Further features of the present invention will become apparent to those skilled in the art to which the present invention relates from reading the following description with reference to the accompanying drawings, in which:

FIG. 5 is a front elevation view of the rear view mirror of FIG. 1;

FIG. 6 is an side elevation view of the rear view mirror of FIG. 1;

FIG. 7 is a plan view of the rear view mirror of FIG. 1;

DETAILED DESCRIPTION

With reference to the figures, a video system is herein described, shown, and otherwise disclosed in accordance with a preferred embodiment of the present invention. More specifically, the present invention provides a vehicle-mounted video system that is capable of recording, storing, and replaying video images, wherein the video system includes at least one internal camera and a display monitor, with both being integrated into the same housing as a rear view mirror of the vehicle, and with the monitor being located substantially behind the mirror such that video images displayed by the monitor are visible through the mirror. The video system may also allow for capturing audio signals and other desirable information, including, for example, location and speed information.

Figure 1:
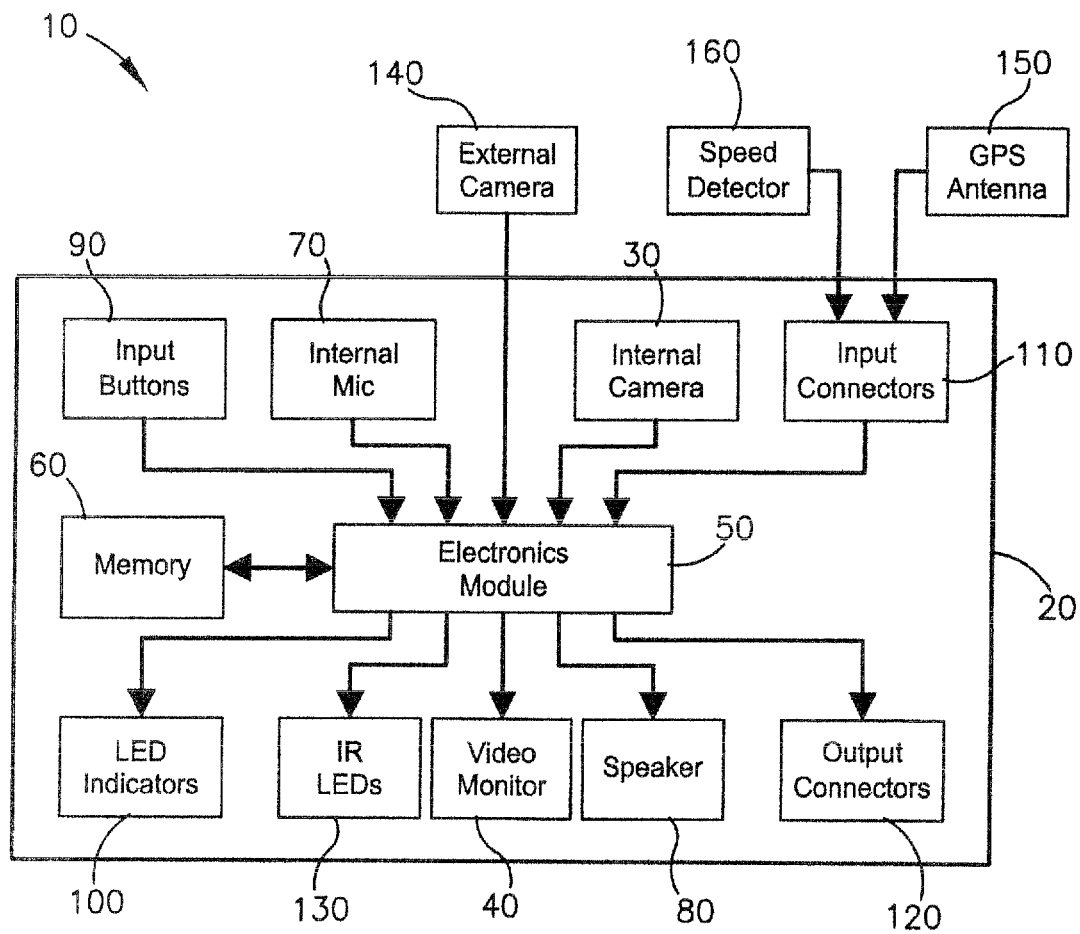
FIG. 1 is a functional block diagram of a video system according to one embodiment of the present invention.

Referring to FIG. 1, an embodiment of the video system 10 is shown broadly comprising various components mounted in or on the rear view mirror housing 20, including an internal camera 30, a video monitor 40, an electronics module 50, a memory 60, an internal microphone 70, a speaker 80, input buttons 90, LED indicators 100, input connectors 110, output connectors 120, and at least one infrared LED 130. The system 10 may also include an external camera 140, a GPS antenna 150, and a speed detector 160.

The internal camera 30 is typically positioned on an upper and central portion of the mirror housing 20 so that it can capture video images of activity within the passenger compartment of the vehicle. Alternatively, the internal camera 30 may be hidden behind the mirror 170. The internal camera 30 may be mounted at an appropriate angle, such as approximately between 10 degrees and 20 degrees to the left, so that the camera 30 is able to properly view the passenger compartment even when the mirror 170 is angled towards the driver during normal use. Camera 30 may also be mounted at approximately 160 degrees or greater when camera 30 is a wide-angle camera. One appropriate camera for use as the internal camera 30 is a 510×492 black and white CMOS sensor with TV resolution, 0.01 Lux sensitivity, and a 140 degree 4-element coated glass lens.

The external camera 140 is mounted outside of the mirror housing 20 in a separate enclosure. The external camera 140 is useful, for example, to record video images when an officer leaves the vehicle, such as during a traffic stop. One appropriate camera for use as the external camera 140 is a color CCD sensor NTSC with 768×484 pixels and 470 lines of resolution, a 10× optical zoom and auto focus capabilities, a wide viewing angle that is from 50.7 to 5.4 degrees, and standard and low light modes.

Figure 2:
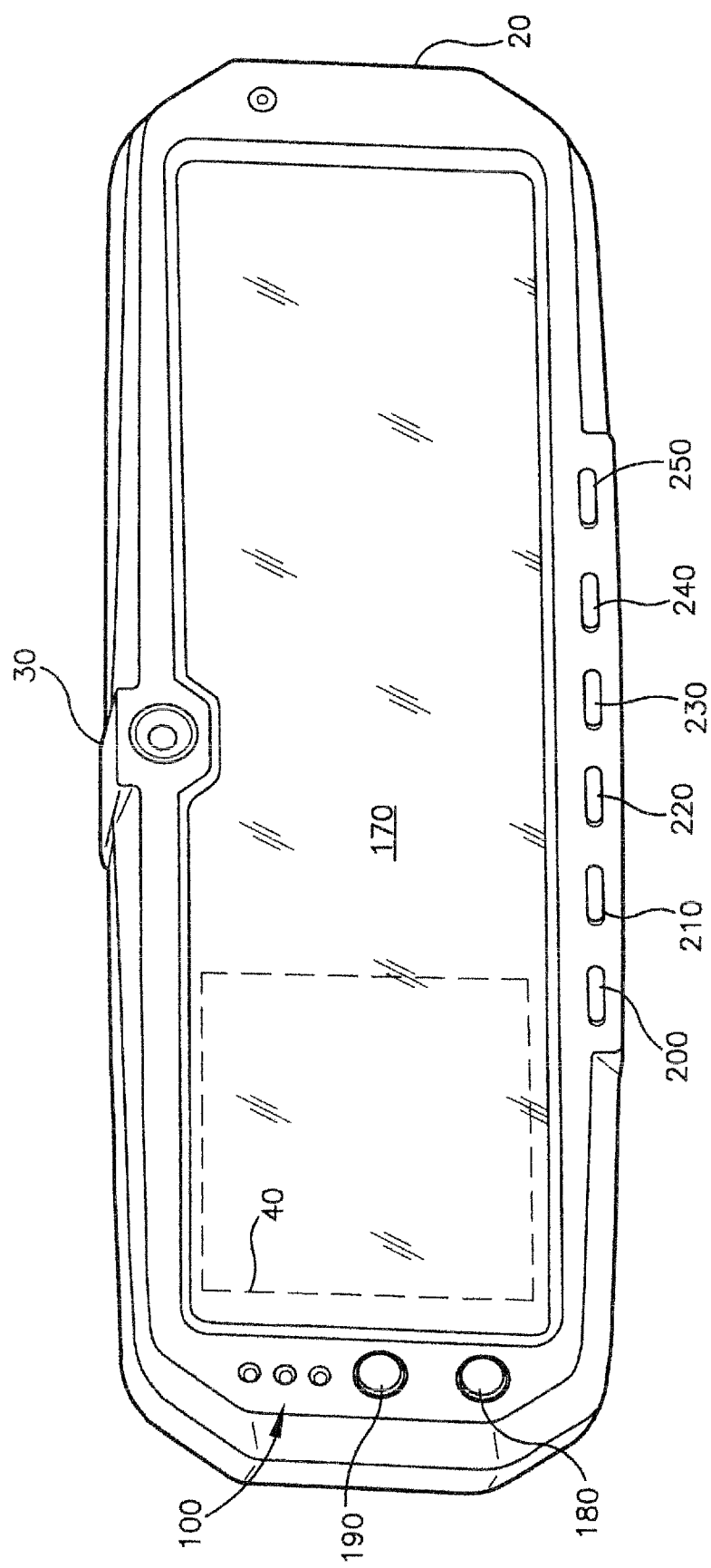
FIG. 2 is a perspective view of a rear view mirror constructed according to one embodiment of the present invention.
Figure 3:
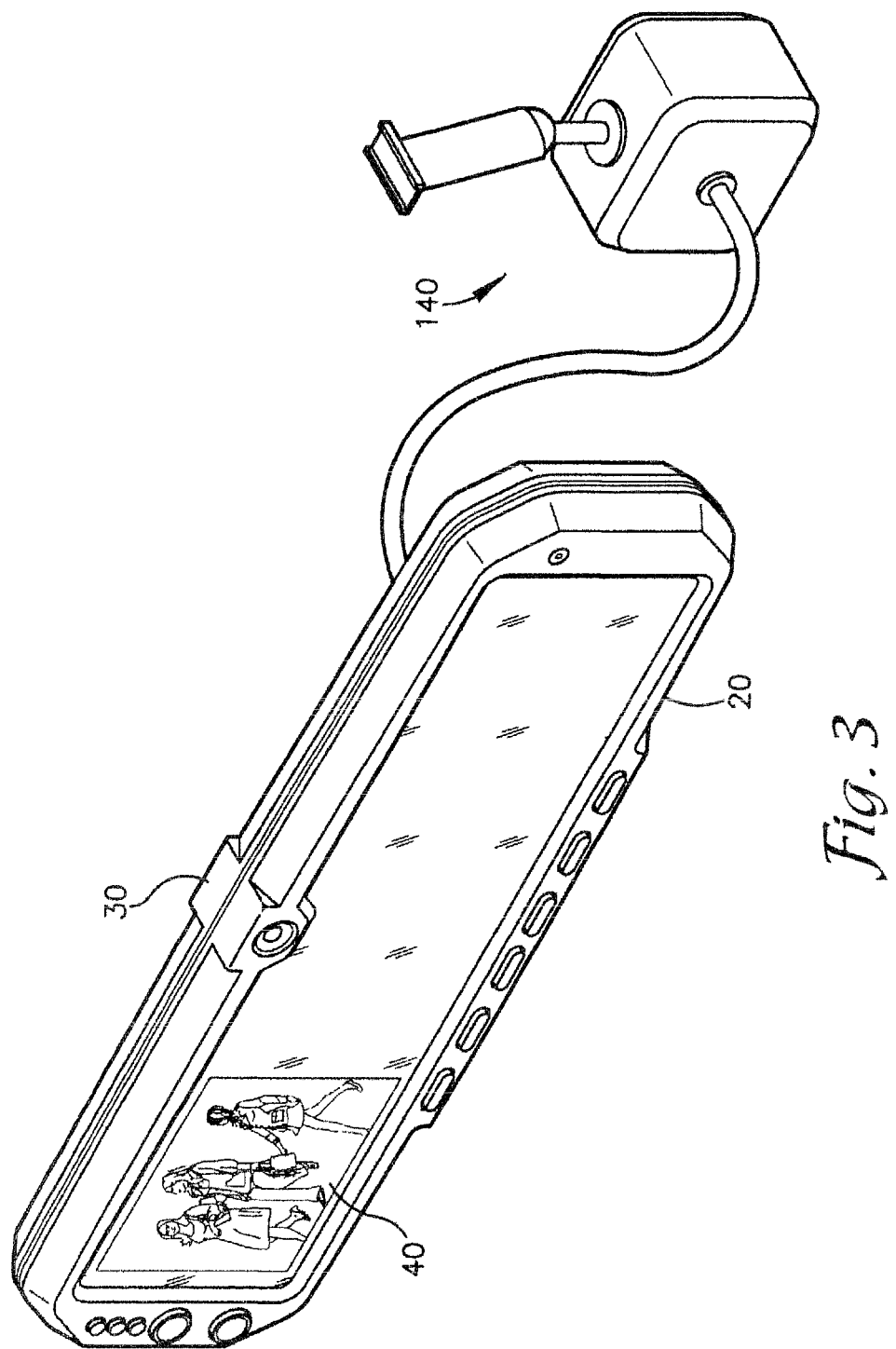
FIG. 3 is a perspective view of a rear view mirror constructed according to an embodiment of the present invention and illustrating an active monitor showing the image from a forward facing external camera mounted in close proximity to the rear view mirror.
Figure 4:
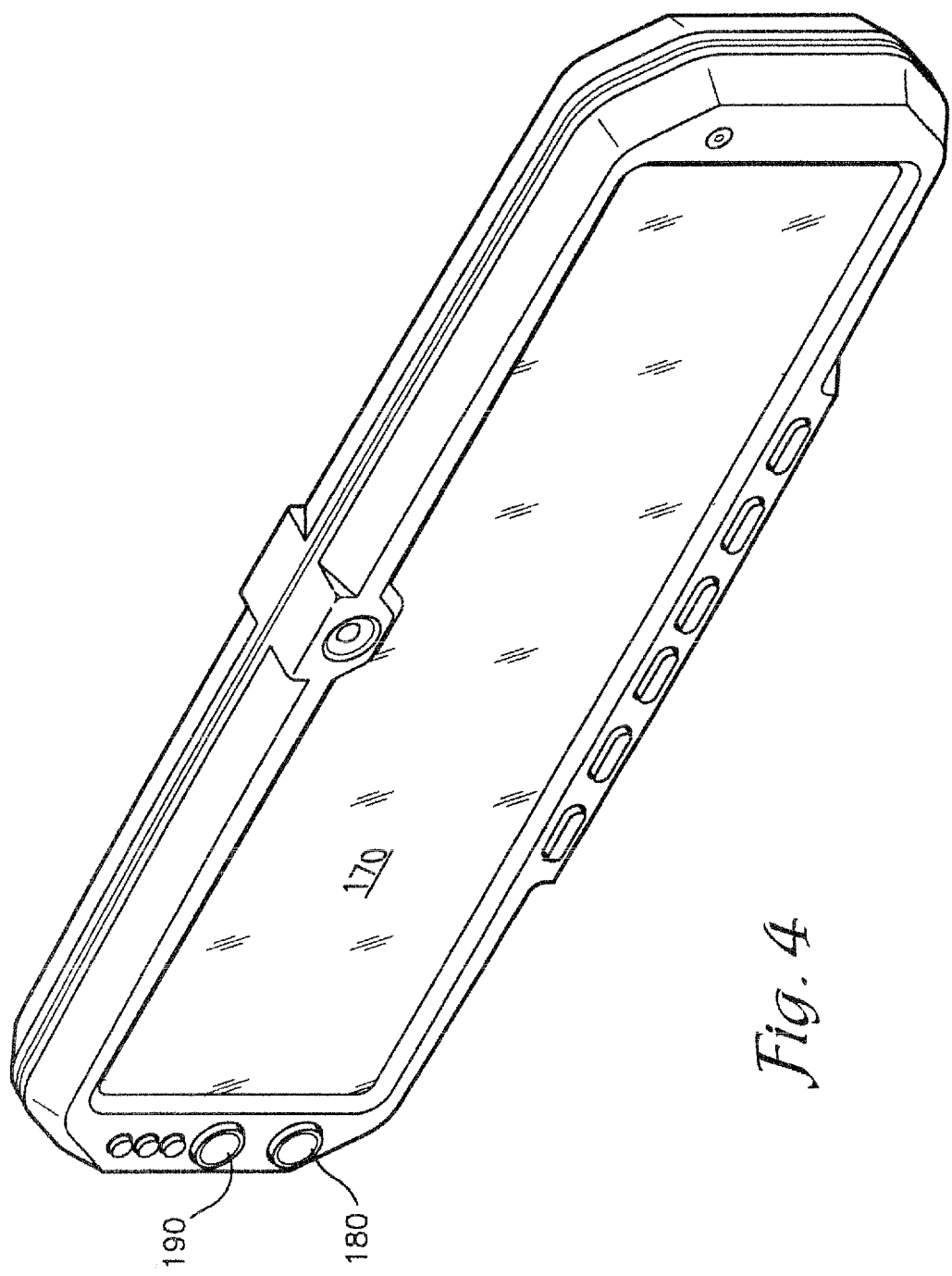
FIG. 4 is a perspective view of the rear view mirror of FIG. 1.

The monitor 40 is mounted substantially behind the mirror 170 (see FIGS. 2 and 3) and works in conjunction with the mirror 170 so that when the monitor 40 is turned on it is viewable through the mirror 170, and when it is turned off it is not visible. The monitor 40 may be operable to automatically turn off when the vehicle begins to move or when the vehicle's transmission is shifted into reverse or drive, so that the driver has full use of the mirror 170 while the vehicle is in motion. Alternatively, the monitor may be mounted adjacent to or only partially behind the mirror 170. One appropriate monitor for use as the video monitor 40 is a 3.5 inch diagonal, 640×480 TFT LCD monitor.

The electronics module 50 includes a number of electronic components, including components for receiving video signals from the video cameras 30,140 and for transmitting video signals to the monitor 40. The electronics module 50 also includes components operable to receive and execute instructions stored in internal memory. In one embodiment, for example, these instructions include menu instructions for setting operational modes and resolutions. These instructions may be updated by loading instructions into a memory card and then inserting that card into a port in the system 10.

The input and output connectors 110,120 are connected to the module 50 for receiving electronic signals thereto and transmitting electronic signals therefrom. The input connectors 110 may include, for example, a connector for power, for the output from the speed detector 160, and for the output from the GPS antenna 150. The input connectors 110 may also include one or more connectors for receiving signals to trigger operation of the system. These triggers may include, for example, turning on the vehicle's siren and/or signal lights. The input connectors 110 may also include a connector for receiving the output of a second external camera, such as a rear-facing camera, and a connector for receiving the output of a second external microphone. The input connectors 110 may also include a port, such as a USB 2.0 port, to allow for directly accessing the memory 60 using a laptop or other computer. The output connectors 120 may include, for example, an audio/visual connector for transmitting audio/visual signals to an external monitor or recording device. Additionally or alternatively, any one or more of these physical connectors 110,120, may be replaced with wireless communication technology allowing the system 10 to wirelessly receive or transmit any of the aforementioned input or outputs. In one embodiment, the input and output connectors 110,120 are provided on an interface module or block which is not located on or integrated into the housing 20, but rather is located in a remote location, such as under the vehicle's dash, and operatively coupled with the module 50 by wire or wirelessly.

The module 50 may also include components for receiving audio signals from audio sources, such as the internal microphone 70, and for transmitting audio signals to the speaker 80. The module 50 may also include components for receiving wireless signals from one or more remote microphones, such as a wireless microphone worn by the officer. In this case, the module 50 may include an integrated 900 MHz (or another suitable frequency allowed by law), spread spectrum, dual receiver capable remote microphone system with a nominal range of up to approximately 1000 feet or greater (a range of several miles may be achieved under the proper conditions).

The module 50 may also include an integrated GPS receiver connected to the GPS antenna 150. Utilizing the information provided by these components, the module 50 may mark recorded video with real-time position data. The system may include a "dead reckoning" function which works with GPS to allow for operation in shielded locations, such as underground garages.

The module 50 may also be connected to the speed detector 140, which may be a radar gun or other conventional speed detecting device, and operable to record speed information provided by the speed detector 140 along with the video images.

The memory 60 is in communication with the module 50 for receiving and storing the video, audio, and other data. One appropriate form of electronic memory for use as the memory 60 is a CF card form factor removable memory module, and one appropriate format for storing the data is MPEG 4 format. Other appropriate forms of electronic memory for use as the memory 60 include micro hard drives, laptop-type hard drives, and flash memory cards. As will be understood by those in the field, the amount of data storable in the memory 60 is dependent, at least in part, on the resolution utilized by the electronics module 50. It is contemplated, however, that the memory 60 may store approximately one hour of data per gigabyte of memory per simultaneous camera for high resolution, approximately two hours of data per gigabyte of memory per simultaneous camera for medium resolution, and approximately four hours of data per gigabyte of memory per simultaneous camera for low resolution.

Referring also to FIGS. 2-7, the input buttons 90 are mounted on the video housing 20 and allow for controlling various components and functions of the system 10. In one embodiment, these buttons 90 may include and operate as follows. A REC button 180 triggers recording in the mode shown in a menu displayed on the monitor 40. Pressing the REC button 180 during recording allows for cycling through the various night and day camera settings. Day and night recording modes may be set automatically using information from an on-board real-time clock or from a light sensor or from the camera 30. A red indicator LED 100 on the front of the unit and a red record LED on the back of the unit are both turned on when the system is recording. A MARK button 190 sets a place for the current GPS position in the video data. A DISP button 200 toggles through settings such as Video Monitor and Control illumination/indicators ON, Video Monitor OFF, Control illumination/indicators ON, and Video Monitor and Control illumination OFF. A Menu button 210 toggles the menu display on the monitor 40 and turns the monitor 40 ON if the display is OFF. A "Play" (large right-facing arrow) button 220 executes commands in Menu Mode and toggles Play/Pause in video playback mode. A "Stop" (square) button 230 acts to cancel the current function in Menu Mode, stops video in Playback Mode, and toggles pre-set Zoom positions in Record Mode. A REV/DOWN button 240 zooms the camera 30 towards Wide in Record Mode, moves down in Menu Mode, and moves in reverse in Playback Mode. A FWD/UP button 250 zooms the camera 40 towards TELE in Record Mode, moves up in Menu Mode, and moves forward in Playback Mode. Other buttons may include an auto zoom feature to assist in reading license plates on other vehicles.

The at least one infrared LED 130 is disposed in the mirror housing 20 and operable to provide infrared illumination inside the vehicle's passenger compartment so that the internal camera 30 can capture video images even when there is little visible light.

Power is supplied to the components of the video system 10 from the vehicle. The power provided is heavily filtered and regulated to avoid interference. The video system 10, using the particular components described herein, may require 4 amps from a 10 V to 13.8 V DC power supply.

The rear view mirror includes the mirror 170 mounted within the housing 20. One appropriate mirror 170 is constructed of mirror glass. One appropriate housing for use as the housing 20 is constructed of a polycarbonate plastic that is resistant to high impacts and high temperatures and is approximately between 12 inches and 14 inches long, 3 inches and 4 inches high, and 0.5 inches and 1.5 inches deep. The vehicle's conventional rear view mirror mount may be replaced by a stronger mount better able to support the weight of the mirror 170 and housing 20 and other components of the system 10. The input buttons 90, discussed above, may be mounted on a front or side surface of the housing 20. The mirror housing 20, and the housings of other components of the system, may include materials operable to shield against electrical or radio interference.

Additionally, the system 10 may be provided with a "stealth" mode in which the cameras 30,140 and the microphone 70 are active and recording, but the lights and indicators, such as the LED 100, are turned off, thereby making the system 10 appear to be dormant.

Additionally, the system 10 may provide "pre-event" recording in which the system 10 records constantly in a loop of a selected duration of time, such as thirty seconds or sixty seconds, so that when an event triggers recording, the events occurring shortly prior to the initiation of recording are also recorded and stored.

Additionally, various embodiments of the system 10 include any one or more of the following features. The system 10 requires entry of a password or code prior to accessing and changing operational settings. The system 10 requires use of a key to remove any removable memory components. The system 10 incorporates electronic watermarks into the recorded video images to prevent tampering or alteration. The system 10 allows for wirelessly downloading the contents of the memory 60 to a laptop or other computer. The system 10 allows for streaming the live video from the cameras 30,140, and possibly other inputs and/or outputs, via a high-speed wireless data network. The system 10 is operable to encode multiple video streams from four or more cameras simultaneously. The system 10 includes a remote control device for allowing a user to remotely control the operation of the system 10. The system 10 includes a temperature sensor and temperature indicator operable to detect and warn the user if the system 10 is at risk of malfunction or damage due to an ambient temperature that is too high or too low for proper operation, such as may easily occur in a vehicle on a very hot or very cold day. The housing 20, and possibly the housings of other components of the system 10, is vented to dissipate heat, and may include other passive or active features to moderate temperature, especially in relatively extreme environments.

Figure 8:
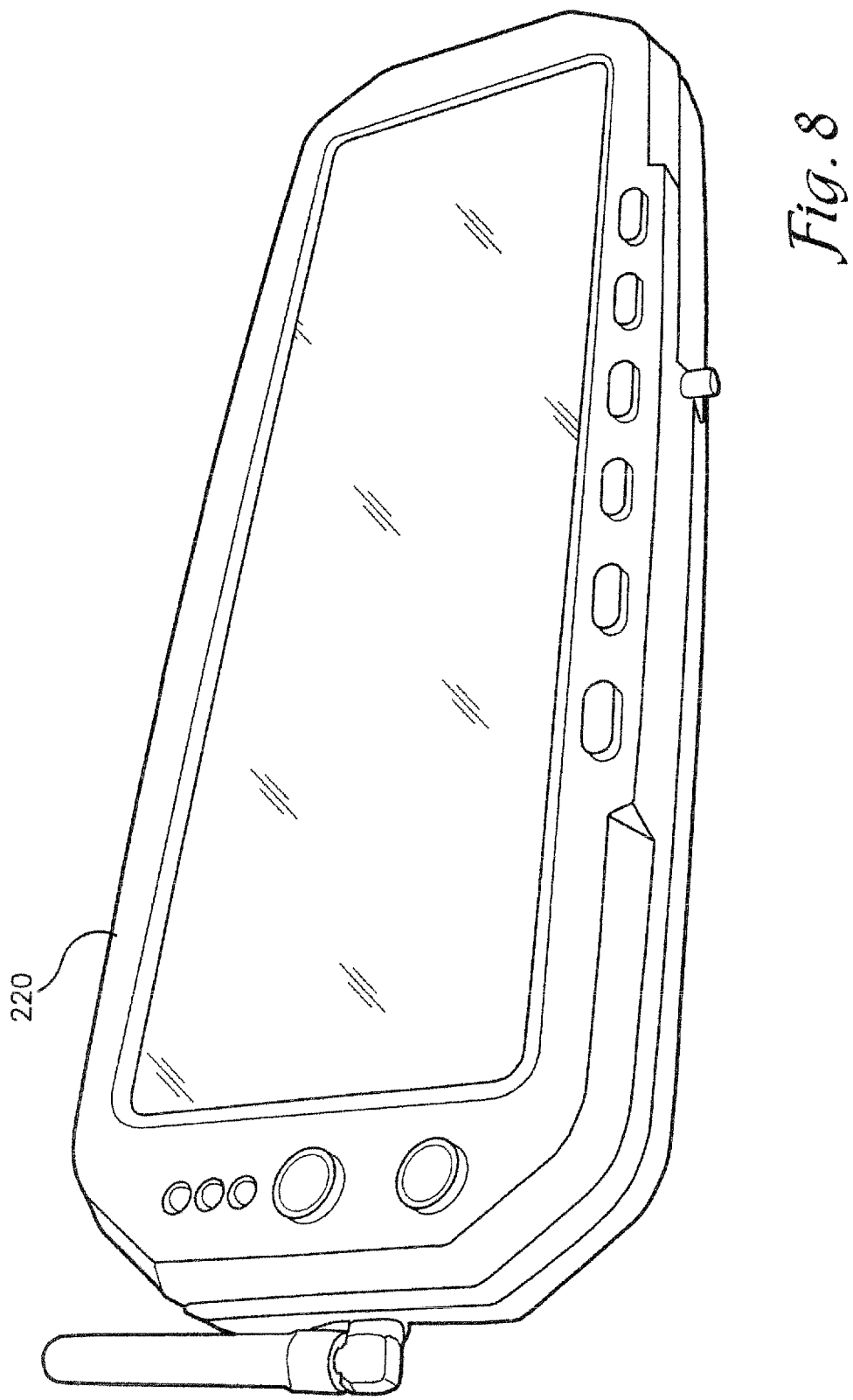
FIG. 8 is a perspective view of a rear view mirror constructed according to another embodiment of the present invention.
Figure 9:
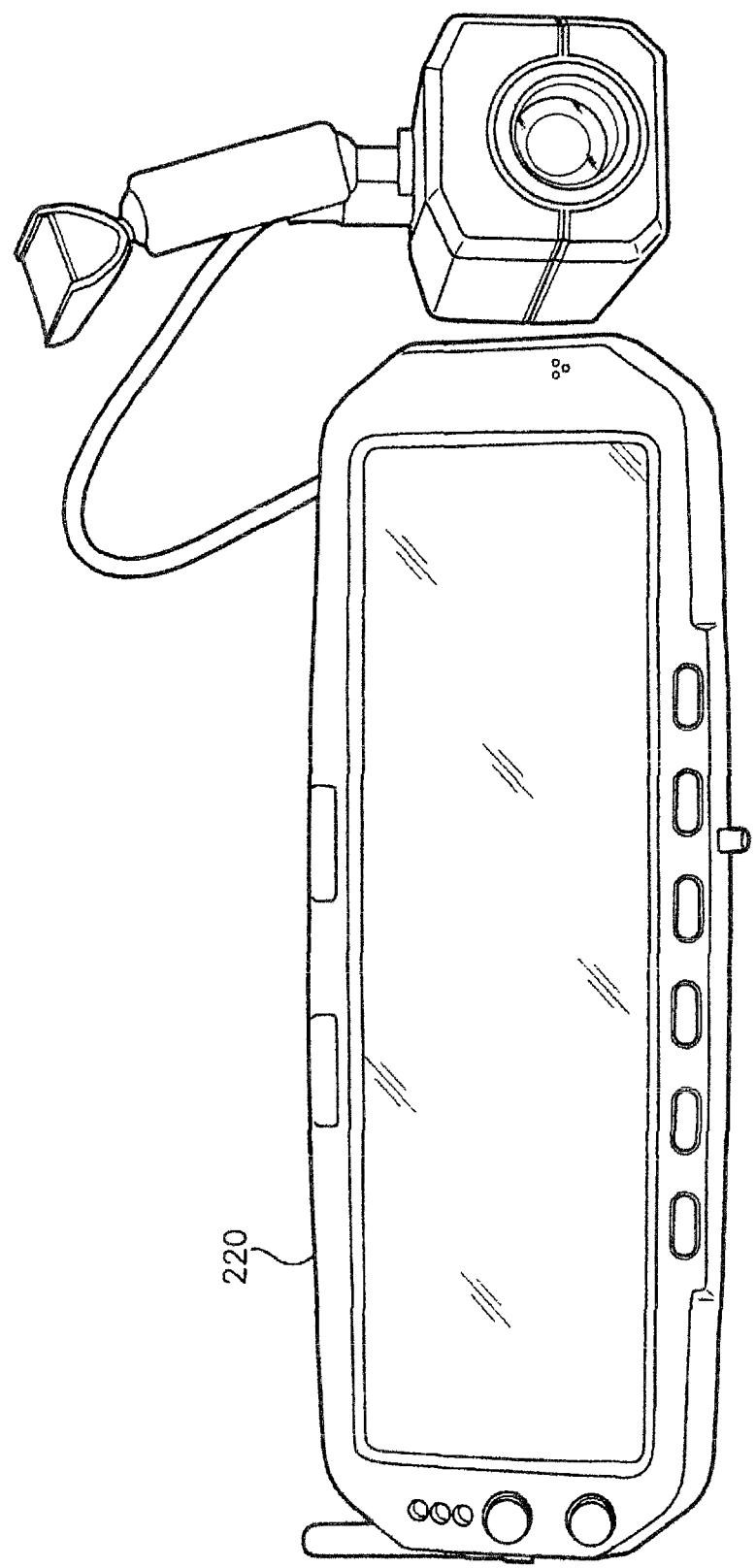
FIG. 9 is a front elevation view of the rear view mirror of FIG. 8.
Figure 10:
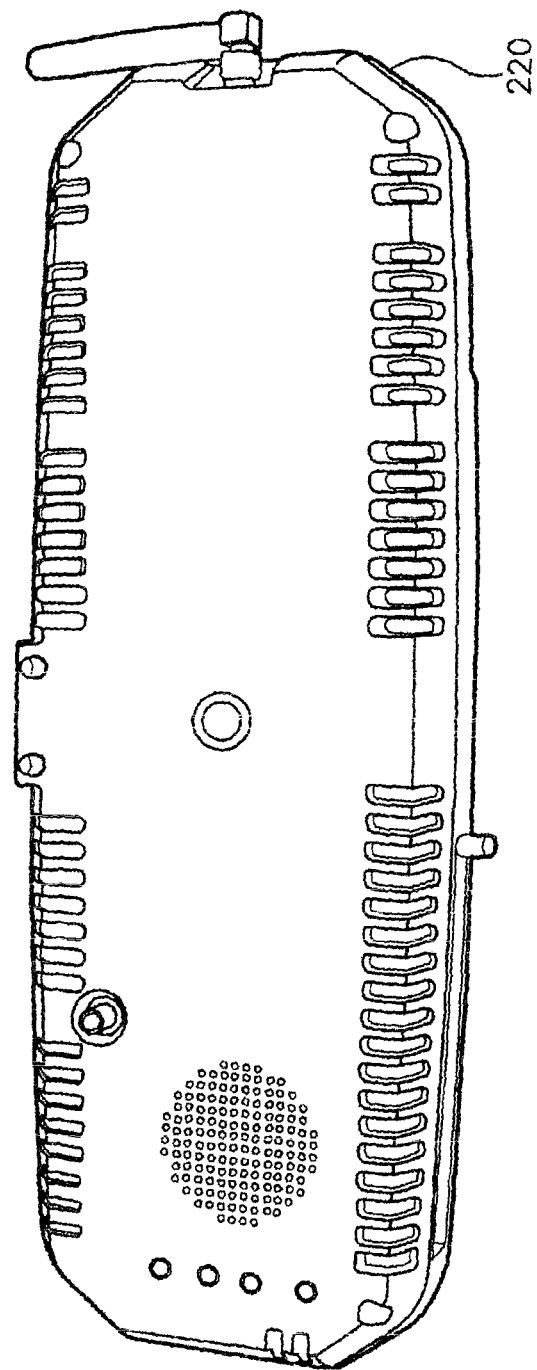
FIG. 10 is a rear elevation view of the rear view mirror of FIG. 8.

Referring also to FIGS. 8-10, a second implementation of the system 10 is shown which is somewhat different in appearance than the implementation shown in FIGS. 2-7, particularly with regard to the housing 220 and the layout of certain components thereabout, but which is otherwise substantially similar in functionality.

It will now be apparent that the present invention is both inexpensive to manufacture and easy to use, especially when compared to current vehicle video systems. The video system of the present invention is fully integrated into a small, easily installable and replaceable package that requires minimal space inside the vehicle. Thus, it replaces several single-purpose devices with a multifunction device that requires the same or less space in the vehicle. Moreover, the video system includes novel features and/or capabilities not present in currently available systems. Those skilled in the art will perceive additional significant improvements, changes, and modifications.

Figure 11:
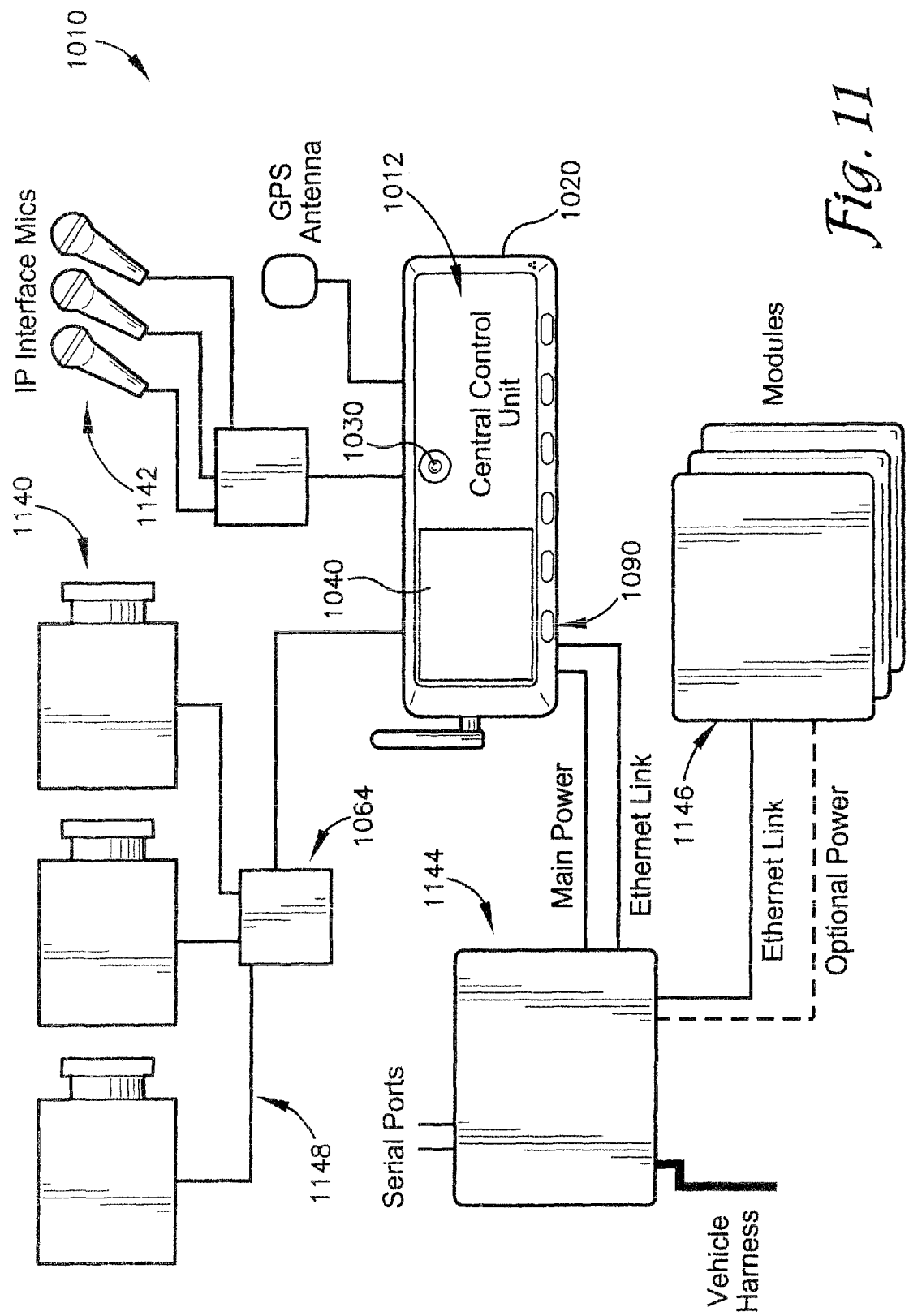
FIG. 11 is a block diagram of a video system according to another embodiment of the present invention.

Referring also to FIG. 11, another embodiment of the above-described system is shown which uses distributed processing, including encoding the video and audio at their source(s) rather than at a centralized location, and a high-speed, e.g., Ethernet, bus connecting the system components and various external devices.

In one implementation, the system 1010 broadly comprises the rear view mirror housing 1020, a central control unit 1012, the internal camera 1030, the display monitor 1040, the input buttons 1090, one or more of the external cameras 1140, one or more external microphones 1142, a vehicle interface box 1144, one or more coprocessing modules 1146, and the high-speed bus 1148.

In this implementation, the central control unit 1012 does not itself encode the video and audio generated by the external camera 1140 and microphone 1142, but rather receives the signals already encoded. As such, the central control unit 1012 includes a decoder for decoding the encoded video and audio to allow for communication via the display monitor 1040 and an associated speaker.

The one or more external cameras 1140 are each operable to both capture video and encode the video before transmitting it to the central control unit 1012 for display and storage. Because encoding can account for 75% of the processing workload in prior art systems, encoding the video at the camera 1140 rather than at the CPU of the central control unit 1012 advantageously allows the central control unit 1012 to support multiple external cameras simultaneously.

Figure 12:
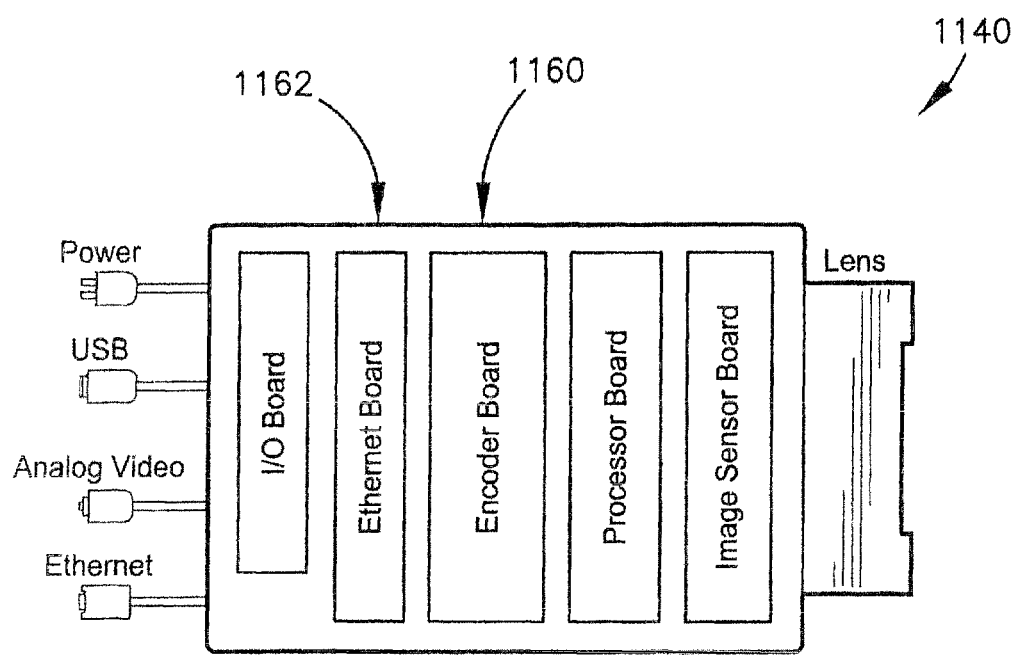
FIG. 12 is a block diagram of a camera component of the video system of FIG. 11.

Generally, existing IP ("Internet protocol") cameras are unsuitable for use in the present system 1010 because they have a tendency to lose frames, which is not acceptable for law enforcement applications in which the video might be used as evidence, and because they have relatively narrow bandwidths, which is also problematic for law enforcement applications in which activity often takes place under extreme lighting conditions, e.g., bright streetlights and dark shadows. However, referring also to FIG. 12, with significant modification, a camera potentially suitable for use as the external camera 1140 in the system 1010 is the IP Reference Camera available from Nuvation Research Corporation. This particular camera includes its own onboard CPU 1160 for encoding video and audio, can be upgraded to high definition (HD) by changing the CPU, and includes an Ethernet port 1162. The IP Reference Camera is significantly less likely to lose frames and has a significantly larger bandwidth than other IP cameras. Nevertheless, as mentioned, the IP Reference Camera still requires significant modification for use in the present system 1010. For example, it is necessary to synchronize the CPU of the central control unit 1012 with the CPUs 1160 of the cameras 10 1140 in order to obtain an accurate time stamp. Also, the pre-event recording loop, described above, is, in this embodiment, implemented on the camera 1140.

In one implementation of the present system, a camera used in conjunction with the present system, such as the Nuvation Research Corporation IP Reference Camera described above, includes a storage component such that captured frames are stored in the camera in addition to being sent to central control unit 1012. These stored frames are also time-stamped during the normal course of operation of the present system. Thus, in the event any frames are lost during transmission from the camera to central control unit 1012, central control unit 1012 is able to request that the camera transmit the lost frames again. Once the lost frames are received, central control unit 1012 can integrate the lost frames into the data already received so that a complete record is formed. Time synchronization between the camera and central control unit 1012 ensures that central control unit 1012 is able to accurately identify missing frames, query the camera for those frames, and properly integrate the missing frames into the record once they are received.

The one or more external microphones 1142 are also each operable to both capture audio and encode the audio before transmitting it to the central control unit 1012 for play or storage, thereby advantageously allowing the central control unit 1012 to support multiple external microphones simultaneously.

The vehicle interface box 1144 is operable to interface various external devices to the system 1010. The external devices may include, for example, any one or more of a crash sensor, a radar gun, and a speedometer.

The one or more co-processing modules 1146 are each operable to provide processing for various additional features to the system 1010. The additional features may include, for example, any one or more of a face recognition feature, a streaming video feature, and a wireless Internet access feature. Further, wireless access may be provided for other networks, such as wireless mesh, that are not associated with the interne in any way.

The high-speed bus 1148 is operable to connect and allow for communication between the various other components of the system 1010. In one implementation, the bus is an Ethernet bus carrying power and data on the same cable. In one implementation, components, such as the cameras 1140 and microphones 1142 spaced apart from the central processing unit 1012, are connected to a hub 1064, and the hub 1064 is connected to the central processing unit 1012 by a single cable. In other implementations of the present system, other methods of communication between the various components of the present system may be used. Such other methods may include, for example, wireless communications, or combinations of wireless and wired communications. Further, although the implementation of the present system shown in the drawings utilize Power Over Ethernet (POE) in order to provide power to components of the present system, it is contemplated that any suitable method of providing such power may be utilized, and that numerous methods of providing power are known to those of skill in the art. It is further contemplated that a backup power source, such as a batter backup, may be used in conjunction with the present system.

It will now be apparent that, along with the earlier-discussed advantages of the first embodiment of the system, the second embodiment provides a number of additional advantages over prior art systems. For example, each external camera and microphone encodes its own video and audio, and therefore, the central control unit can support multiple cameras and microphones simultaneously, the cameras and microphones can be located much further away from the central control housing (which is important in larger vehicles) because encoded digital signals are less susceptible to the electrical interference and signal degradation experienced by unencoded analog signals, and the cameras and microphones can be easily added or replaced without requiring significant changes to the central control unit. Additionally, the high-speed bus carries both data and power to system and external components on the same cable, thereby eliminating the plurality of separate cables for power, video, audio, and communication required by prior art systems. Bus hubs allow for collecting and communicating data streams from multiple cameras, microphones, and other devices over a single cable, thereby eliminating the need to provide a long cable for each device. Bus connectivity and standard communication protocols allow for quickly adding features using plug-in modules. More generally, changes to the system can be accomplished with significantly less expense and time, allowing the system to adapt to user demands and extending the system's useful life.

Although various exemplary data formats and data transfer protocols are identified above, it is contemplated that any suitable format or protocol, whether now existing or hereafter developed, may be used in conjunction with the present invention. The discussion of specific formats or protocols herein is not intended to limit the scope of the present invention. For example, although the MPEG-4 format is mentioned above for encoding and storing audiovisual data obtained by the present system, it is contemplated that other formats such as, for example, H.263 and H.264, may also be used. Likewise, audiovisual data may be stored in high-definition (HD) format. Hardware or software changes or upgrades may be required in order to change formats, however the inventive functionality of the present system, as described herein, is preserved regardless of the specific format used. Because one goal of law enforcement implementations of the present system is to produce an evidentiary record, it is preferred that a lossless format be used in those implementations.

In addition to various suitable formats that may be used in conjunction with the present system, it is contemplated that any suitable data transfer protocol may be used. For example, real-time streaming protocol (RTSP) may be used to transfer data in the present system providing that the system is adapted to recover any lost frames from the camera. User datagram protocol (UDP) provides a better, lossless protocol for use with the present system. Any suitable existing protocol may be used, and new protocols may be developed for use with the present system. Because implementations of the present system include a data storage function in the camera, as described above, for retrieval of frames lost during data transfer, it is contemplated that typical IP cameras having such a storage feature may be used, with the system ensuring that lost frames are faithfully transmitted to central control unit 1012 when requested therefrom.

As noted above, the present system may be used with a variety of software, audiovisual formats, data transfer protocols, and the like. In some instances, changes to formats or protocols, or even making hardware changes such as upgrading the system to a HD-capable camera, may require that the software of the present system be updated. In some implementations of the present system, it is contemplated that the system software will be capable of being upgraded in the field. In such implementations, software upgrades may be provided via a memory card, portable flash memory device, a wireless data link to a portable devices, a wireless internet data link, or any other suitable device or method for upgrading the system software in the field. In some implementations wherein wireless communications are used for system upgrades, it is contemplated that the present system may optionally include a wireless communications component adapted to connect to a remote source for obtaining updates automatically. Such communications could, for example, be carried out over the internet via a cellular communications signal that allows the present system to access the internet.

In addition to what has been described above, various peripheral devices may be utilized in conjunction with the present invention. In law enforcement implementations of the present system, for example, or in other implementations where security is important, the present system may be provided with a biometric identification component or other secure identification component. In an implementation of the present system requiring biometric identification, for example, a fingerprint may be required before a user of the present system can log into the system and begin to use the system. Other security peripherals include, for example, a dongle carried by a user of the present system that can be presented to the system in order to verify the identity of a user. Any suitable security component or method may be included with the present invention.

In addition to maintaining or verifying user security, the present system may also include additional components to establish the security and evidentiary value of the audiovisual data recorded thereby. For example, it is contemplated that the cameras 1140 associated with the present system include a unique identifier, such as a serial number or other identifier that is unalterable, and that audiovisual signals obtained by any given camera are stamped with that camera's identifier. Thus, the identity of the camera that acquired any given data is verified and secured along with the actual data recorded by the system.

It is further contemplated that a CD or DVD burner may be provided as a component of the present system so that a user of the system can make a copy of captured audiovisual data while in the field. Any suitable recording device and medium known in the art may be used in association with the present invention.

Peripheral devices used for interfacing with the present system may also be provided. For example, a keyboard may be provided, the keyboard adapted to plug directly into the present system or to communicate wirelessly with the present system via Bluetooth, infrared, or other suitable method of wireless communication. Further, it is contemplated that a PDA, laptop, smartphone, or other mobile device may be adapted (for example by installing software thereon) for communication with and manipulation of the present system. Such devices may be used to manipulate a display associated with the present system, or to configure or control the present system.

With respect to any of the various peripherals that may be associated with the present system, whether described herein or not, it is contemplated that the peripherals may be plugged into or otherwise associated with electronics module 50 or central control unit 1012, or that any of cameras 1140 may be adapted to communicate with the peripherals, either through a hard-wired or wireless connection.

Although the invention has been disclosed with reference to various particular embodiments, it is understood that equivalents may be employed and substitutions made herein without departing from the contemplated scope of the invention. For example, specific suitable hardware, processors, software, and the like as described above is exemplary and not intended to limit the present invention. Any suitable hardware may be used to implement the inventive functionality of the present system.

What is claimed is:

1. A video system for a vehicle, the system comprising:
a rear view mirror housing;
a mirror mounted in the rear view mirror housing;
a first video camera attached to the rear view mirror housing and configured to capture first video data;
a second video camera attached to the rear view mirror housing and configured to capture second video data;
wherein the first video camera and the second video camera are configured to implement a recording loop such that video signals from the first camera and the second camera are simultaneously and continuously encoded and stored in a removable memory module,
a first video camera memory storing the first video data;
a second video camera memory storing the second video data,
wherein the first video data is encoded at the first video camera,
wherein the second video data is encoded at the second video camera;
a microphone integrated into the rear view mirror housing and configured to capture audio data,
wherein the audio data is encoded at the microphone;
a central control unit installed in the rear view mirror housing and configured to receive the first video data from the first camera, the second video data from the second camera and the audio from the microphone;
a memory port adapted to receive the removable memory module, wherein the removable memory module is operable to receive and store the first video data, the second video data and the audio from the central control unit;
a user input configured to be manipulated by a user; and
a display monitor configured to selectively display at least one of the first video data and the second video data;
wherein the display monitor is configured to display setting information thereon, such that the user can change the setting information by manipulation of the user input,
wherein the display monitor is mounted in the rear view mirror housing substantially behind the mirror, and the mirror and the display monitor being configured so that the displayed video is viewable through the mirror,
wherein lost frames are retrieved by the central control unit from the first video camera memory when it is determined that the first video data received at the central control unit does not include the lost frames.

2. The video system of claim 1, wherein the first and second video cameras are synchronized via the central control unit so as to provide an accurate time stamp associated with the respective captured video.

3. The video system of claim 1, wherein the display monitor is configured to selectively display no video data, the first video data, and the second video data.

4. The video system of claim 1, wherein the system includes day and night recording modes.

5. The video system of claim 1, wherein the central control unit is configured to play back on the display previously recorded video data.

6. The video system of claim 1, wherein the first camera and the second camera are wide-angle cameras.

7. The video system of claim 1, wherein the central controller timestamps the first video data and the second video data.

8. The video system of claim 1, further comprising an LED recording indicator.

9. The video system of claim 1, further comprising an audio/visual connector for transmitting video data and audio data to an external monitor.

10. The system of claim 1, wherein the audio data is encoded at the microphone at least by converting the audio data from an unencoded analog signal to a digital signal.

11. A rear-view mirror video camera apparatus, comprising:
a rear view mirror housing;
a mirror mounted in the rear view mirror housing;
a first video camera attached to the rear view mirror housing and configured to capture first video data;
a second video camera attached to the rear view mirror housing and configured to capture second video data,
wherein the first video data is encoded at the first video camera,
wherein the second video data is encoded at the second video camera;
a first video camera memory storing the first video data;
a second video camera memory storing the second video data,
a microphone integrated into the rear view mirror housing and configured to capture audio data,
wherein the audio data is encoded at the microphone;
a removable flash memory module configured to store the first video data from the first camera, the second video data from the second camera and the audio from the microphone such that video signals from the first camera and the second camera are simultaneously and continuously encoded and stored in the removable flash memory module; and
a display monitor configured to selectively display at least one of the first video data and the second video data,
wherein the display monitor is mounted in the rear view mirror housing substantially behind the mirror, and the mirror and the display monitor being configured so that the displayed video is viewable through the mirror,
wherein lost frames are retrieved from the first video camera memory when it is determined that the first video data stored at the removable flash memory module does not include the lost frames.

12. The apparatus of claim 11, wherein the first and second video cameras are synchronized so as to provide an accurate time stamp associated with the respective captured video.

13. The apparatus of claim 11, wherein the display is configured to selectively display no video data, the first video data, and the second video data.

14. The apparatus of claim 11, wherein the camera apparatus includes day and night recording modes.

15. The apparatus of claim 11, wherein the display monitor is configured to play back on the display previously recorded video data from the removable memory module.

16. The apparatus of claim 11, wherein the first camera and the second camera are wide-angle cameras.

17. The apparatus of claim 11, wherein the first video data and the second video data include a timestamp.

18. The apparatus of claim 11, further comprising an LED recording indicator.

19. The apparatus of claim 11, further comprising an audio/visual connector for transmitting video data and audio data to an external monitor.

20. The apparatus of claim 11, wherein the audio data is encoded at the microphone at least by converting the audio data from an unencoded analog signal to a digital signal.

* * * * *